United States Patent
Chizi et al.

(10) Patent No.: US 9,549,075 B2
(45) Date of Patent: Jan. 17, 2017

(54) METHOD FOR AUTOMATICALLY ESTABLISHING LOCATION-BASED CONFERENCE CALLS

(71) Applicant: DEUTSCHE TELEKOM AG, Bonn (DE)

(72) Inventors: Barak Chizi, Ashkelon (IL); Dudu Mimran, Tel Aviv (IL); Bracha Shapira, Beer Sheva (IL); Gil Rosen, Tel Aviv (IL)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 14/847,045

(22) Filed: Sep. 8, 2015

(65) Prior Publication Data
US 2016/0072956 A1   Mar. 10, 2016

(30) Foreign Application Priority Data
Sep. 8, 2014  (IL) .......................................... 234535

(51) Int. Cl.
*H04M 3/56* (2006.01)
*H04W 4/02* (2009.01)
*H04M 3/424* (2006.01)
*H04W 88/02* (2009.01)

(52) U.S. Cl.
CPC ............. *H04M 3/563* (2013.01); *H04M 3/424* (2013.01); *H04M 3/56* (2013.01); *H04W 4/023* (2013.01); *H04M 2203/5063* (2013.01); *H04W 88/02* (2013.01)

(58) Field of Classification Search
CPC ........ H04M 3/56; H04M 3/563; H04M 3/424; H04M 2203/5063; H04W 88/02; H04W 4/023
See application file for complete search history.

(56) References Cited

U.S. PATENT DOCUMENTS

| | | | |
|---|---|---|---|
| 8,472,613 | B1 | 6/2013 | Pan et al. |
| 2010/0315483 | A1 | 12/2010 | King |
| 2011/0135077 | A1* | 6/2011 | Wengrovitz ............ H04M 3/56 379/202.01 |
| 2011/0307550 | A1* | 12/2011 | Bastide ............... H04L 12/1827 709/204 |
| 2012/0121076 | A1 | 5/2012 | Yoakum |
| 2012/0149349 | A1* | 6/2012 | Quade ............... H04M 3/42357 455/416 |
| 2014/0241515 | A1 | 8/2014 | Oswal et al. |

OTHER PUBLICATIONS

Communication and European Search Report for a counterpart foreign application—European Application No. 15 18 4304—mailed Jan. 29, 2016; 7 pages.

* cited by examiner

*Primary Examiner* — Nizar Sivji
(74) *Attorney, Agent, or Firm* — Roach Brown McCarthy & Gruber P.C.; Kevin D. McCarthy

(57) ABSTRACT

A method for automatically establishing multi-participant interactions and/or conference calls between users of mobile devices, according to which an interaction establishing application is installed on the mobile device of each participating user and receives for each user, phone numbers of other users defined as his friends and a list of predetermined triggers as conditions for initiating an interaction between users. The application constantly monitors the location of each user's mobile device and upon detecting that one or more of the triggers are met, the application automatically initiates one or more interactions between users that comply with the triggers that are met.

10 Claims, 1 Drawing Sheet

METHOD FOR AUTOMATICALLY ESTABLISHING LOCATION-BASED CONFERENCE CALLS

FIELD OF THE INVENTION

The present invention relates to the field of cellular communication. More particularly, the invention relates to a system and method for automatically establishing location-based interactions and conference calls between users of mobile phones.

BACKGROUND OF THE INVENTION

Most of the interactions between users of cellular phones are made via a user-to user call, where there are only two parties. However, in many cases, users should interact with two or more users at the same time, usually in the form of a conference call, which is a widespread communication platform. However, establishing a conference call requires that several steps will be performed by one of the participants (usually the initiator of the call):

At the first step, the initiator should search one of the other participants (the first one) in his phone's contact list.

At the second step, he should dial to the first one, and wait until he answers the call.

At the third step, he asks him to wait on the line and repeats the preceding steps for all participants. Only then, all of them can talk with each other.

This is a cumbersome process, since it is carried out manually. In addition, one or more of the participants may be busy and cannot accept the call. This requires skipping him, moving to the next participant, and returning back to him at a later stage.

This task becomes even more difficult when the initiator is not free to perform all the required steps manually, such as while driving.

It is therefore desired to provide a system and method that will be able to automatically establish interactions and conference calls between users of mobile phones, without the need for dialing.

It is an object of the present invention to provide a system and method that automatically establishes interactions and conference calls between users of mobile phones, without dialing.

It is another object of the present invention to provide a system and method that automatically establishes interactions and conference calls between users of mobile phones, in response to predetermined relations between the locations of each participant.

Other objects and advantages of the invention will become apparent as the description proceeds.

SUMMARY OF THE INVENTION

The present invention is directed to a method for automatically establishing multi-participant interactions and/or conference calls between users of mobile devices, according to which an interaction establishing application is installed on the mobile device of each participating user and receives for each user, phone numbers of other users defined as his friends and a list of predetermined triggers as conditions for initiating an interaction between users. The application constantly monitors the location of each user's mobile device and upon detecting that one or more of the triggers are met, the application automatically initiates one or more interactions between users that comply with the triggers that are met.

A trigger may be two or more users entering a polygon included in a list of predefined stationary polygons, each of which having location data of its vertices.

In one aspect, upon detecting that a first user entered one of the predefined polygons, the application continuously seeks the location of friends of the first user. If one of the first user's friends entered the same polygon, the application automatically dials, to the first friend and if the first friend is able to take the call, they are allowed talking to each other by the application. If an additional friend of the first user entered the polygon, the application automatically dials to the additional friend and if the additional friend is able to take the call, the additional friend is joined to the existing call. This process is repeated, while in each time upon detecting that another additional friend of the first user entered the polygon, the another additional friend is joined to the existing conference call established between all preceding users.

The application is adapted to redial to each user that could not join the call upon dialing to him. Any connected user is allowed to stop participating in a conference call by pressing a predefined button in his mobile device.

A trigger may be created in response to an event selected from the following group:
a) entering a predefined stationary geographical zone being the area surrounding of a specific Point of Interest (POI);
b) encountering one or more friends that entered a virtual zone that is centered at the location of the first user and moves with the first user anywhere;
c) sharing a similar context;
d) any combination thereof.

Interactions between participating users may be made using natural voice or an audio cue, which may be a sound signature retrieved by the application from a database or a coded audio message.

In one aspect, each participating user is allowed to mute himself from other participants or from all of them. Also, whenever several triggers are activated at the same time, each participating user is allowed to select an active call to which he will be added, according to his preferences. A user is also allowed to participate in more than one interaction or conference call, at the same time.

The present invention is also directed to a communication network, which comprises:
a) a plurality of users' mobile devices, to be automatically connected to each other by multi-participant interactions and/or conference calls over the network;
b) an interaction establishing application, installed on the mobile device of each participating user;
c) a communication server for:
c.1) receiving for each user, by the application, phone numbers of other users defined as his friends;
c.2) receiving for each user, by the application, a list of predetermined triggers being conditions for initiating an interaction between users;
c.3) constantly monitoring, by the application, the location of each user's mobile device; and
c.4) upon detecting that one or more of the triggers are met, automatically initiating one or more interactions between users that comply with the triggers that are met.

DETAILED DESCRIPTION OF PREFERRED EMBODIMENTS

The system and method of the present invention are capable of automatically establishing interactions and conference calls between users of mobile phones, without dialing and in response to predetermined relations (triggers) between the locations of each participant of the conference call. This is done by using several triggers, such as location and event triggers, which are initiated if two or more participants enter to a specific polygon that contains additional participants (which may be predefined as their friends).

Figure 1:
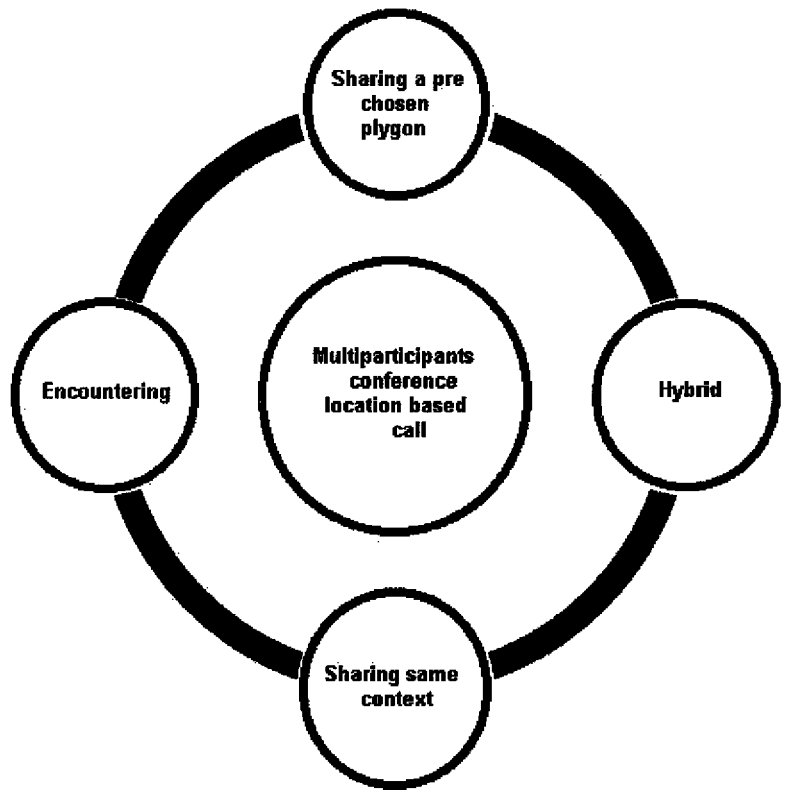
FIG. 1 shows several triggers for automatically establishing a conference call between users that are friends of each other, according to an embodiment of the invention.

FIG. 1 shows several triggers for automatically establishing a conference call between users that are friends of each other, according to an embodiment of the invention. Generally, a conference call will be automatically establishing between users by an application which will be installed in advance on the mobile device of each user. The application will be adapted to perform the following steps:

As the first step, each user will be asked by the application to define other users (e.g., according to their phone numbers) as his friends, for the purpose of establishing a conference call.

At the next step, the application will receive a list of predefined stationary polygons, along with the location data of each vertex of each polygon.

At the next step, the application will constantly monitor the location of each user's mobile device, and upon detecting that a first user entered one of the predefined polygons, the application will continuously seek the location of all his friends.

At the next step, upon detecting that one of the first user's friends (the "first" friend) entered the same polygon, the application will automatically dial to that first friend and if the first friend will be able to take the call (by pressing an appropriate button), the application will allow them talking to each other.

At the next step, upon detecting that an additional friend of the first user (the "second" friend) entered the same polygon, the application will automatically dial to that additional fiend and if the he will be able to take the call (by pressing an appropriate button), the application will join him to the existing call between the first user and the first friend. At this stage, the conference call will include all three of them.

At the next steps, this process will be repeated, while in each time upon detecting that another additional friend of the first user entered the same polygon, he will be joined to the existing conference call established between all preceding users. The application will also be adapted to redial to each user that could not join the call upon dialing to him (e.g., being busy or being in the middle of another call).

Of course, any user allowed to stop participating in a conference call by pressing the "end" button.

The first trigger may be entering a predefined polygon (predetermined geographical zone, in which the location of each user is known or may be calculated, based on the registration of his mobile device in communication stations of a data network, such as base stations in a cellular network or a "hot point" in a WiFi or other wireless network), such as the area surrounding of a specific Point of Interest (POI). When a user enters such a polygon, useful information can be yield from other users that currently located in. In such case, by using predefined polygon, the user may communicate immediately with others based on the above condition. For example, such predefined polygon may include a shopping center, a movie theater, a football pitch etc. In this example, each user that enters the predefined polygon will be automatically added to the conference, once the application decided to establish it (i.e., at least two users entered that polygon).

The second trigger may be encountering a friend, even without seeing him. Such encountering may be defined by a virtual circle (or other zones with different shapes) having a predetermined radius (e.g., 30 m) which is centered at the location of the first user and moves with him anywhere, thereby defining a virtual "moving circle" which determines a close vicinity of the first user (who may be a potential initiator of a conference call). While the first user is moving on his route, he might meet friends passing him or moving in parallel routes. This trigger enable the user to establish immediate communication, based on the encountering. The radius can be predetermined, or defined by the first user.

Whenever another user who is defined as a friend of the first user enters that virtual moving circle, the application which detects that (by calculating the relative distance between them, based on their location data) will automatically dial to the friend and establish a call between them. Similarly, any other friend of the first user who will enter that virtual moving circle will also be added to the conference call.

Whenever another user who is defined as a friend of the first user enters that virtual moving circle, the application which detects that (by calculating the relative distance between them, based on their location data) will automatically dial to the friend and establish a call between them. Similarly, any other friend of the first user who will enter that virtual moving circle will also be added to the conference call.

The third trigger may be sharing a similar context, since users having the same context may share similar activities. For example, users may be shopping, eating or doing any activity that is correlated with each other, in different locations. Participating in such shared activities sometimes requires communication (in the form of a conference call between them or any other electronic interaction, such as internet based interactions, a VOIP call and web applications such as WhatsApp etc.), in order to have feedback from each other. For example, if several users are shopping at the same time, but in different stores, the application can detect that, since the location of each store is known. Also, the application can detect that several users are on their way to a particular store according to the location data over time of each one. For example, the location of the starting point of each one (e.g., home or work), the time and the destination to which they are approaching may be analyzed.

In response, the application will establish a conference call between them and they will be able to exchange or share important information, such as comparing prices and providing recommendations to each other (e.g., about sales that are offered by particular stores, etc.).

The fourth trigger may be any combination of some previously described triggers. For example, a combination between the first trigger (entering a predefined polygon) and the third trigger (sharing a similar context). In his example, that application will establish a conference call between users only if they enter the same polygon and share the same context (i.e., shopping, dining etc.).

Figure 2:
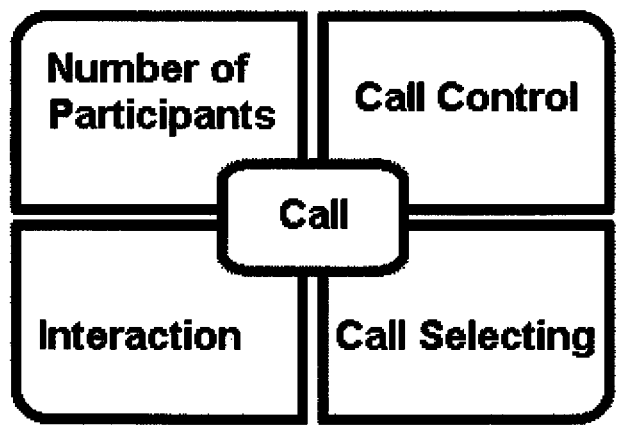
FIG. 2 illustrates possible interactions between different users that may be performed by different types of communication, according to an embodiment of the invention.

FIG. 2 illustrates possible interactions between different users that may be performed by different types of communication. The properties of each interaction may be related to the number of participants, which should be two or more. The nature of the call can yield an interaction platform, based on the trigger that initiated it. For example, the participants can interact with each other using their natural voice or by providing an audio cue, such as a sound signature that can be retrieved by the application from a database. The sound signature may have a direct or indirect interpretation (such as a coded message meaning that the user is now at home or at work). Each participant can interact by opening his own audio like in a walkie-talkie. Each participant will be able mute himself or mute other participants. Muting elected participant from a conference call will be possible only for the user who wishes that and they will not be muted to other participants. For example, during a conference call of 10 participants, a user may decide that he wishes to mute himself from participants 3 and 7. If several triggers are activated at the same time, each user will be able to select an active call to which he will be added, according to his preferences. In addition, a user can participate in more than one call, at the same time.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A method for automatically establishing multi-participant interactions and/or conference calls between users of mobile devices, comprising the steps of:
    a) user performed installing of an interaction establishing application on the mobile device of each participating user:
    b) server performed receiving for each user, by said application, phone numbers of other users defined as his friends;
    c) server performed receiving for each user, by said application, a list of predetermined location or event triggers being conditions for initiating an interaction between users;
    d) constantly monitoring, by said application, the location of each user's mobile device; and
    e) upon detecting that one or more of said predetermined locations or event triggers as identified in item (c) are met, automatically initiating one or more interactions between users that comply with the triggers that are met;
    wherein one of said triggers is initiated when two or more users enter a polygon included in a list of predefined stationary polygons, each of said polygons being defined by location data associated with each of its vertices, whereupon:
        i. the location of friends of a first user is continuously sought, following detection of entry of said first user into a selected polygon of said predefined polygons;
        ii. a first friend of said first user is automatically dialed by a first automatic dialing, upon detecting that said first friend entered said selected polygon, allowing said first user and said first friend to talk to each other by said application, if said first friend is able to accept a call in response to said first automatic dialing;
        iii. an additional friend of said first user is automatically dialed by a second automatic dialing, upon detecting that said additional friend entered said selected polygon, causing said additional friend to be joined to an existing conversation to establish a conference call, if said additional friend is able to accept a call in response to said second automatic dialing; and
        iv. step iii is repeated for one or more another additional friends of said first user upon being detected to have entered said selected polygon, causing said one or more another additional friends to be joined to said conference call.

2. The method according to claim 1, wherein the application is adapted to redial each user that was not able to accept a call in response to an automatic dialing operation.

3. The method according to claim 1, further comprising allowing any connected user to stop participating in the conference call by pressing a predefined button in his mobile device.

4. The method according to claim 1, wherein one of the triggers is initiated in response to an event selected from the following group:
    a) entering a predefined stationary geographical zone being an area surrounding of a specific Point of Interest (POI);
    b) encountering one or more friends that entered a virtual zone that is centered at the location of the first user and moves with said first user anywhere;
    c) sharing a similar context; and
    d) any combination thereof.

5. The method according to claim 1, wherein interactions between participating users are made using natural voice or an audio cue.

6. The method according to claim 5, wherein the audio cue is selected from the group of a sound signature retrieved by the application from a database; and a coded audio message.

7. The method according to claim 1, further comprising allowing each participating user to mute himself from other participants or from all of them.

8. The method according to claim 1, further comprising, whenever several triggers are activated at the same time, allowing each participating user to select an active call to which he will be added, according to his preferences.

9. The method according to claim 1, further comprising allowing the user to participate in more than one interaction or conference call, at the same time.

10. A communication system, comprising:
    a) a plurality of users' mobile devices, to be automatically connected to each other by multi-participant interactions and/or conference calls over said network;
    b) an interaction establishing application, installed on the mobile device of each participating user;
    c) a communication server in data communication with each of said applications, said server configured to:
        c.1) receive for each of said users, by said application, phone numbers of other users defined as his friends;
        c.2) receive for each of said users, by said application, a list of predetermined location or event triggers being conditions for initiating an interaction between users;
        c.3) constantly monitor, by said application, the location of each of said mobile devices;

c.4) automatically initiate, upon detecting that one or more of said predetermined locations or event triggers as identified in item (c.2) are met, one or more interactions between users that comply with the triggers that are met;

wherein one of said triggers is initiated when two or more users enter a polygon included in a list of predefined stationary polygons, each of said polygons being defined by location data associated with each of its vertices, whereupon said server is further configured to:

c.5) continuously seek the location of friends of a first user, following detection of entry of said first user into a selected polygon of said predefined polygons;

c.6) automatically dial a first friend of said first user by a first automatic dialing, upon detecting that said first friend entered said selected polygon, allowing said first user and said first friend to talk to each other by said application, if said first friend is able to accept a call in response to said first automatic dialing;

c.7) automatically dial an additional friend of said first user by a second automatic dialing, upon detecting that said additional friend entered said selected polygon, causing said additional friend to be joined to an existing conversation to establish a conference call, if said additional friend is able to accept a call in response to said second automatic dialing; and c.8) repeat step iii for one or more another additional friends of said first user upon being detected to have entered said selected polygon, causing said one or more another additional friends to be joined to said conference call.

\* \* \* \* \*